United States Patent
Brown (10) Patent No.: US 9,951,718 B2
(45) Date of Patent: Apr. 24, 2018

(54) AUTOMATIC BIFURCATION LATCH SYSTEMS FOR A THRUST REVERSER

(71) Applicant: ROHR, INC., Chula Vista, CA (US)

(72) Inventor: Keith T. Brown, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 575 days.

(21) Appl. No.: 14/626,353

(22) Filed: Feb. 19, 2015

(65) Prior Publication Data

US 2016/0245226 A1 Aug. 25, 2016

(51) Int. Cl.
 *B64D 29/06* (2006.01)
 *F02K 1/54* (2006.01)
(52) U.S. Cl.
 CPC .............. *F02K 1/54* (2013.01); *B64D 29/06* (2013.01)
(58) Field of Classification Search
 CPC ..... F02K 1/54; F02K 1/70; F02K 1/78; F02K 1/80; F02K 1/805; B64D 29/06
 See application file for complete search history.

(56) References Cited

U.S. PATENT DOCUMENTS

| 4,549,708 | A | * | 10/1985 | Norris | B64D 29/06 244/129.4 |
|---|---|---|---|---|---|
| 6,340,135 | B1 | * | 1/2002 | Barton | B64D 29/00 244/53 B |
| 7,275,362 | B2 | * | 10/2007 | Strunk | F02K 1/766 244/110 B |
| 9,376,215 | B2 | * | 6/2016 | Forcier | B64D 29/06 |
| 9,476,383 | B2 | * | 10/2016 | Caruel | F02K 1/72 |
| 9,587,516 | B2 | * | 3/2017 | Fabre | E05B 41/00 |
| 9,708,073 | B2 | * | 7/2017 | Pretty | B64D 29/00 |
| 2010/0001123 | A1 | * | 1/2010 | Hillereau | B64D 29/06 244/54 |
| 2013/0043350 | A1 | * | 2/2013 | Defrance | B64D 29/06 244/131 |
| 2013/0062433 | A1 | * | 3/2013 | Vauchel | B64D 29/06 239/265.19 |
| 2015/0377071 | A1 | * | 12/2015 | Sawyers-Abbott | B64D 29/06 60/805 |
| 2017/0275010 | A1 | * | 9/2017 | Pretty | B64D 29/06 |

* cited by examiner

*Primary Examiner* — Carlos A Rivera
(74) *Attorney, Agent, or Firm* — Snell & Wilmer L.L.P.

(57) ABSTRACT

A nacelle may include a pylon and a thrust reverser having an inner fixed structure. A locking mechanism may automatically engage and prevent relative movement between a thrust reverser half and the pylon. A bumper may be coupled to the inner fixed structure. The locking mechanism may limit deflections between the thrust reverser and the pylon in response to a burst duct. The locking mechanism may allow the thrust reverser halves to be opened for access to the engine.

12 Claims, 9 Drawing Sheets

AUTOMATIC BIFURCATION LATCH SYSTEMS FOR A THRUST REVERSER

FIELD

The disclosure generally relates to turbofan propulsion systems for aircraft. More particularly, the disclosure relates to deflection limiting systems for a thrust reverser in a nacelle for a turbofan propulsion system.

BACKGROUND

Modern aircraft may utilize one or more turbofan propulsion systems powered by a gas turbine engine. The propulsion system may include a nacelle, which is a system of components that house the engine and its ancillary systems, and help form aerodynamic surfaces for flight, including a fan bypass air duct. Often, the nacelle includes a thrust reverser. The thrust reverser includes an inner fixed structure ("IFS") surrounding the engine which forms part of the interior surface of the bypass air duct through the thrust reverser. The IFS defines a core compartment that surrounds the engine. The engine may comprise various high pressure ducts, such as a compressor bleed duct and an anti-ice air duct. The ducts may hold high pressure, high temperature air. In some cases, a duct may rupture or a seal may leak, which is generically termed a "burst duct." During various operating conditions, such as after a burst duct, pressure in the core compartment may exceed pressure in the bypass air duct. In these conditions, the radially outward net positive pressure on the IFS may lead to large, unacceptable deflections. These deflections may cause the sealing between the IFS and the engine to be broken. This condition could lead to air scooping the structure leading to major damage and safety concerns. Latches have been proposed and used to reinforce the IFS by either latching the IFS to the pylon or engine, or latching the IFS halves to each other, but these existing latches suffer from various disadvantages or insufficiencies. For example, the latches may require remote engagement because there is no way to physically access the latch to manipulate it between its open and closed positions. Remote engagement presents many challenges, because the remote engagement mechanism or system can be complex, cumbersome to integrate into the structure, and can be unreliable.

SUMMARY

An aircraft nacelle may comprise a first thrust reverser half and a second thrust reverser half coupled to a pylon. The first thrust reverser half and the second thrust reverser half may be rotatable about hinges between a closed position in which the first thrust reverser half and the second thrust reverser half enclose a core compartment, and an open position in which the first thrust reverser half and the second thrust reverser half are separated and allow access to the core compartment. The aircraft nacelle may comprise a locking mechanism configured to maintain a seal in response to a burst duct. The locking mechanism may be configured to automatically engage in response to the first thrust reverser half being closed.

In various embodiments, the locking mechanism comprises a first mechanical linkage coupled to the first thrust reverser half, and a second mechanical linkage coupled to the pylon, wherein the first mechanical linkage is configured to cause the second mechanical linkage to unlock a latch in response to the first thrust reverser half being opened. The locking mechanism may comprise a rack and a pinion. The rack may be configured to rotate the pinion in a first direction in response to the first thrust reverser half closing. The rack may be configured to rotate the pinion in a second direction in response to the first thrust reverser half opening. The bumper may comprise an endcap. The latch may be configured to contact the endcap in response to an increase in pressure in the core compartment. The first thrust reverser half may comprise a top bifurcation panel. The bumper may be coupled to the top bifurcation panel. The rack may be coupled to the top bifurcation panel between the bumper and the hinge. The latch may be coupled to the pylon. The locking mechanism may be configured to cause the latch to disengage in response to a top bifurcation panel separating from the pylon. The latch may be coupled to a post having an angled gear.

An aircraft nacelle may comprise a first thrust reverser half configured to move relative to a pylon in order to open the first thrust reverser half, and a latch coupled to the pylon and movable between a latched position in which the latch prevents relative movement between the first thrust reverser half and the pylon, and an unlatched position in which the latch permits relative movement between the first thrust reverser half and the pylon. The latch may latch automatically in response to the first thrust reverser half closing.

In various embodiments, the latch may unlatch automatically in response to the first thrust reverser half opening. The latch may limit deflection of the first thrust reverser half in response to a burst duct. The aircraft nacelle may comprise a rack coupled to the first thrust reverser half, and a pinion coupled to the pylon, wherein the rack is configured to rotate the pinion. The pinion may comprise a first angled gear, wherein the latch comprises a second angled gear, and wherein the pinion is configured to engage the latch via the first angled gear and the second angled gear.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for limiting deflections in a nacelle with latches are disclosed below in accordance with various embodiments. During flight, an engine duct may burst resulting in increased pressures inside a core compartment surrounding the engine, or other conditions might exist which create a higher pressure inside of the core compartment than outside, resulting in a net force radially outward against the thrust reverser. Also, conditions might exist where a portion of the thrust reverser deflects and begins to scoop the high velocity air stream in the bypass air duct, which can result in pressures and forces difficult to control and provide challenges in ensuring the continued integrity of the thrust reverser structure. Latches may be employed to prevent deflections of the thrust reverser structures. A latch is preferable to a permanent mechanical attachment to reinforce the thrust reverser because the thrust reverser should be removable or openable by ground support personnel in order to reach the engine in the core compartment for inspection and servicing. However, a latching system can be difficult to deploy for this purpose as the position of the latching mechanism may be inaccessible to ground support personnel, in which case the latching and unlatching of the system must happen remotely. Remotely operated latching mechanisms have been proposed and used, such as described in U.S. Pat. No. 7,275,362, but they may not be the ideal solution. Proposed herein are latching solutions which latch automatically in response to the halves of the thrust reverser being closed, without human intervention, to provide latch support when it is beneficial to prevent deflections of the thrust reverser structure, and to unlatch automatically in response to the halves of the thrust reverser being opened when the engine may benefit from inspection or servicing.

Figure 1:
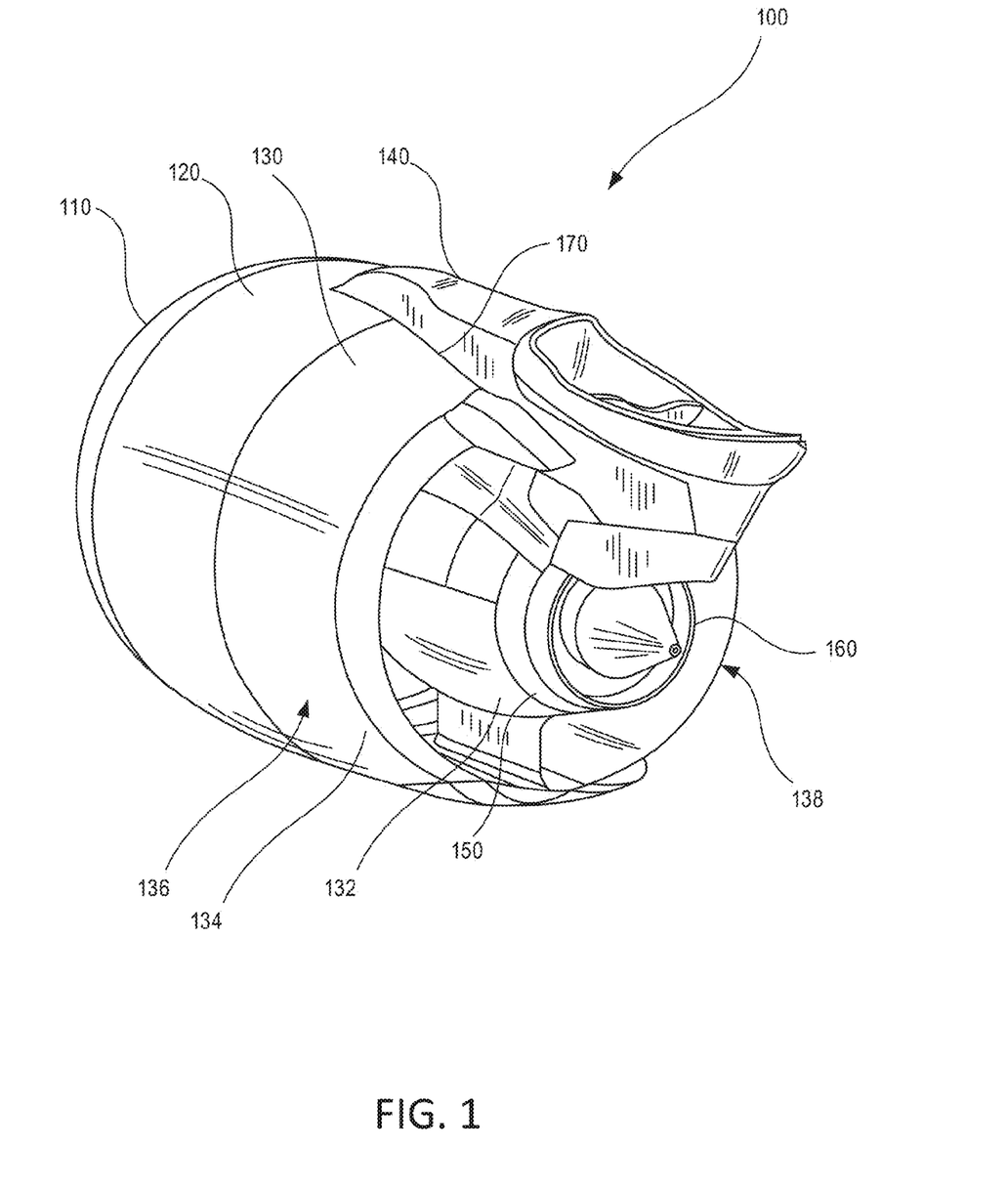
FIG. 1 illustrates a perspective view of a nacelle in accordance with various embodiments of the disclosure.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and a translating sleeve 134. Bypass air from an engine fan may flow in a generally annular bypass air duct defined between the IFS 132 and the translating sleeve 134. The IFS 132 may be formed together with or be coupled to at its aft end a core cowl 150, which in turn is adjacent to a nozzle 160 for core engine exhaust air. The thrust reverser 130 may further be split into a left half 136 and a right half 138, such that there is, for example, a left half and a right half of IFS 132. The left half 136 and the right half 138 may be hinged to the pylon 140 at hinges 170. The left half 136 and the right half 138 may hinge open at hinges 170 in order to provide access to the engine for inspection or servicing. The left and right halves of the IFS 132 may together help form a core compartment around the engine when the left and right halves 136, 138 of the thrust reverser are closed.

Figure 2:
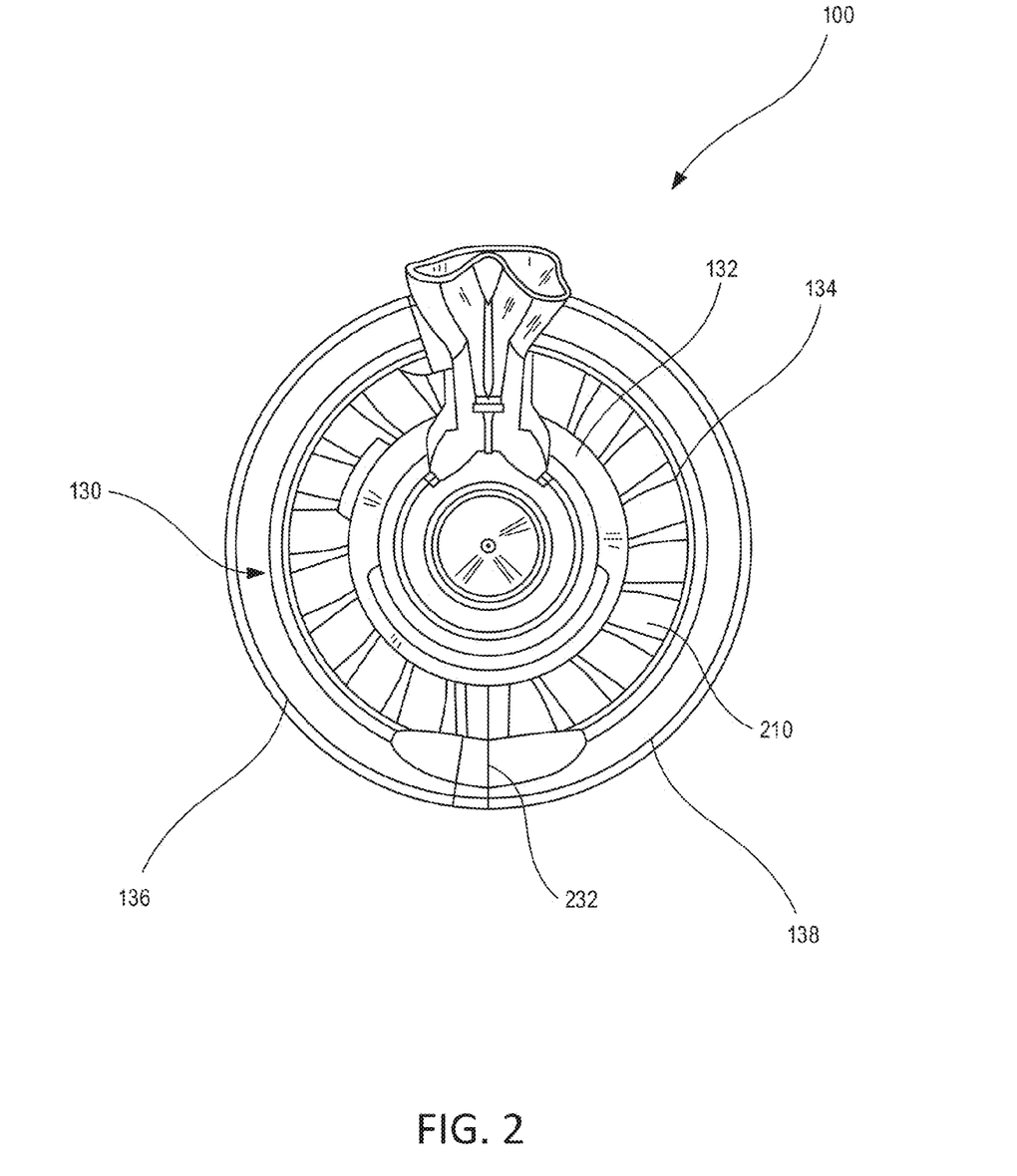
FIG. 2 illustrates an aft view of a nacelle in a closed position in accordance with various embodiments of the disclosure.

Referring to FIG. 2, an aft view of nacelle 100 in a closed position is illustrated according to various embodiments. Left half 136 and right half 138 of thrust reverser 130 may be split along split line 232. Engine fan 210 is visible through the bypass air duct between IFS 132 and translating sleeve 134.

Figure 3:
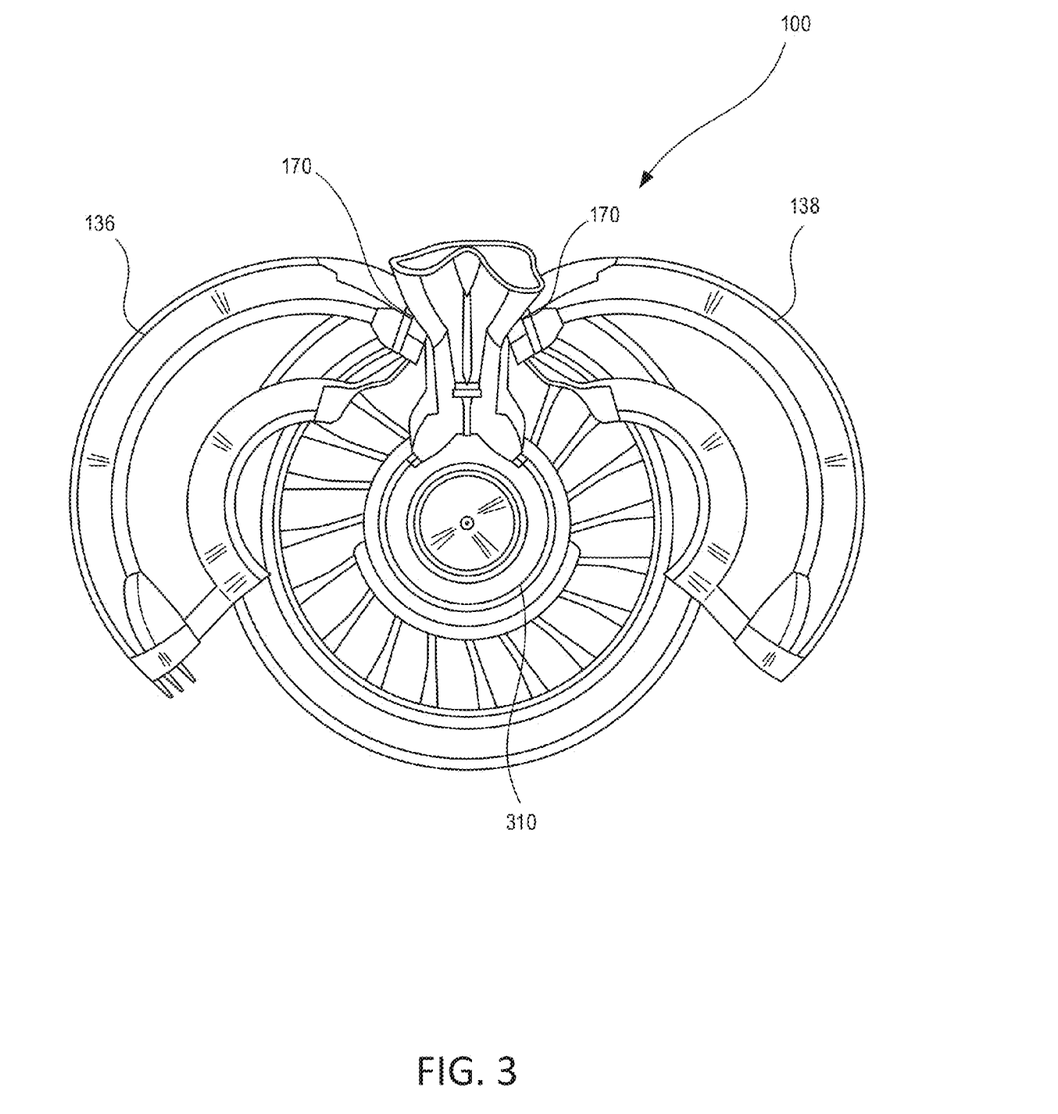
FIG. 3 illustrates an aft view of a nacelle in an open position in accordance with various embodiments of the disclosure.

Referring to FIG. 3, an aft view of nacelle 100 with the thrust reverser halves 136, 138 hinged open is illustrated according to various embodiments. Thrust reverser halves 136, 138 are hinged open at hinges 170 in order to provide access to engine 310.

Figure 4:
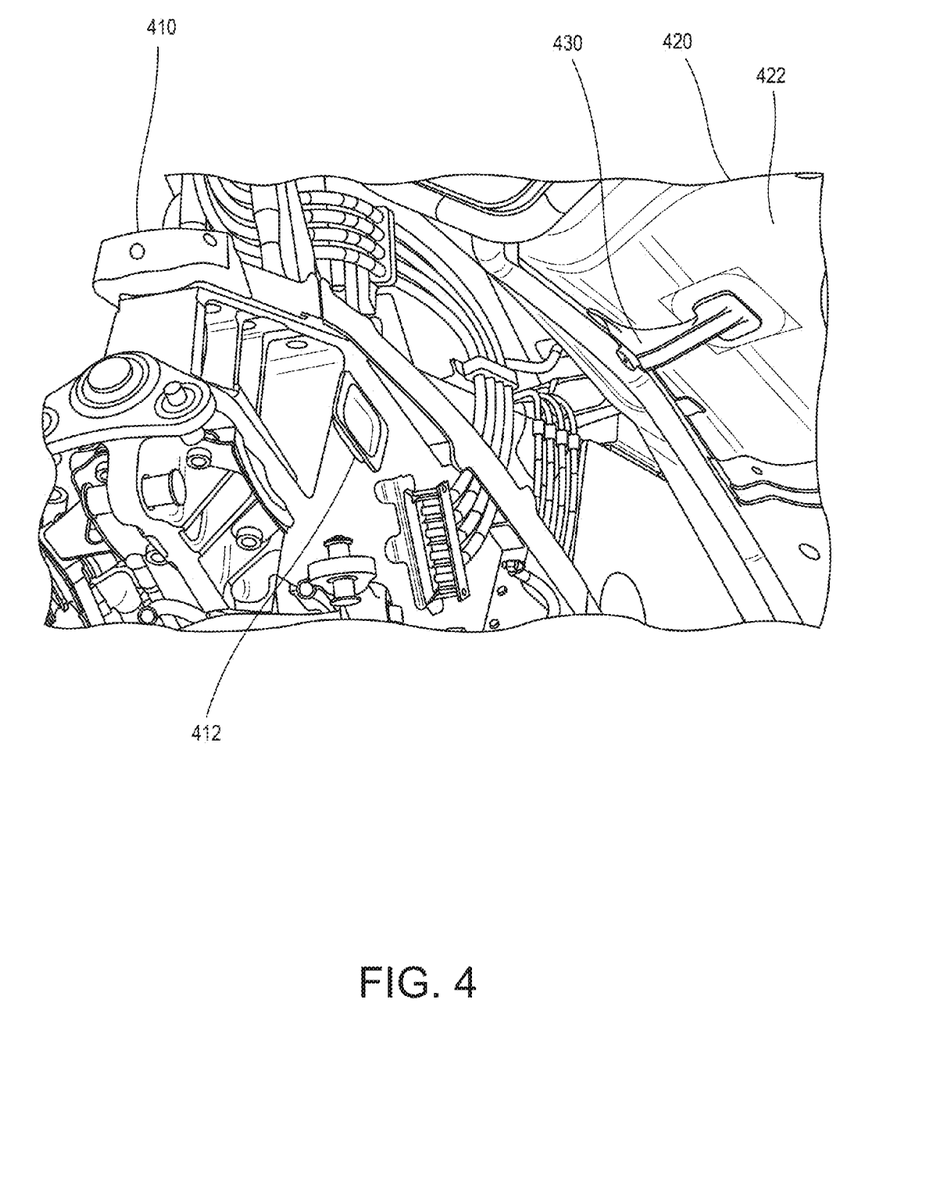
FIG. 4 illustrates a perspective view of a pylon and a thrust reverser having a bumper in accordance with various embodiments of the disclosure.

Referring to FIG. 4, a perspective view of a pylon 410 and a thrust reverser 420 having a bumper 430 is illustrated according to various embodiments. The bumper 430 may be coupled to the IFS 422 of the thrust reverser 420. In the closed position, the bumper 430 may contact an engagement feature 412 on the pylon. The bumper 430 may transmit loads from the thrust reverser 420 to the pylon 410.

Figure 5:
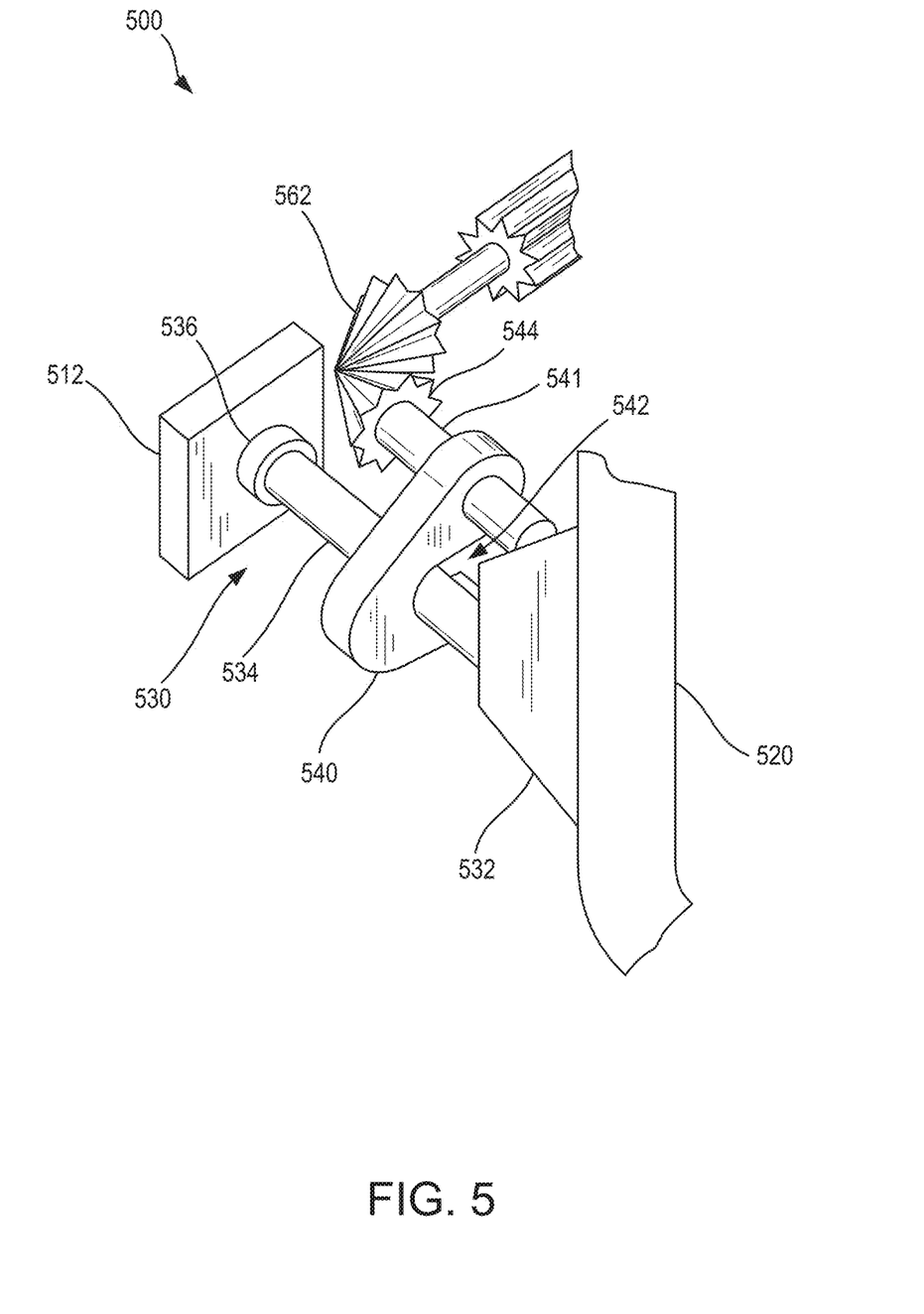
FIG. 5 illustrates a perspective view of an automatic latching system in accordance with various embodiments of the disclosure.

Referring to FIG. 5, a perspective view of an automatic latching system 500 is illustrated according to various embodiments. The automatic latching system 500 may comprise a bumper 530 coupled to an IFS 520. The bumper 530 may comprise a base 532, a post 534 coupled to the base 532, and an endcap 536 coupled to the post 534. The post 534 may be generally cylindrical and extend from the base 532 away from the IFS 520. The endcap 536 may comprise a diameter larger than a diameter of the post 534. The endcap 536 may be configured to contact the pylon engagement feature 512.

A latch 540 may be configured to capture the bumper 530. The latch 540 may generally comprise a "C" shape. The latch 540 may rotate such that the post 534 of the bumper 530 is located within the gape 542 of the latch 540. The endcap 536 may be larger than the gape 542. Thus, in response to a force on the IFS 520 in the direction away from the pylon engagement feature 512, such as due to a burst duct, the endcap 536 may contact the latch 540, and the latch 540 may prevent further deflection of the IFS 520.

The latch 540 may be coupled to a shaft 541. The shaft 541 may comprise a gear 544. In various embodiments, the gear 544 may be an angled gear. The gear 544 may engage a drive gear 562. The drive gear 562 may rotate and drive the gear 544, causing the latch 540 to engage or disengage the bumper 530. The drive gear 562 may cause the latch 540 to engage the bumper 530 in response to the IFS 520 closing (e.g. after completion of inspection of the engine), and the drive gear 562 may cause the latch 540 to disengage from the bumper 530 in response to the IFS 520 being opened. However, in response to a deflection in the IFS 520 due to a burst duct or other increase in pressure, the endcap 536 may contact the latch 540 without the latch 540 disengaging, and the latch 540 may prevent further deflection of the IFS 520.

Figure 6:
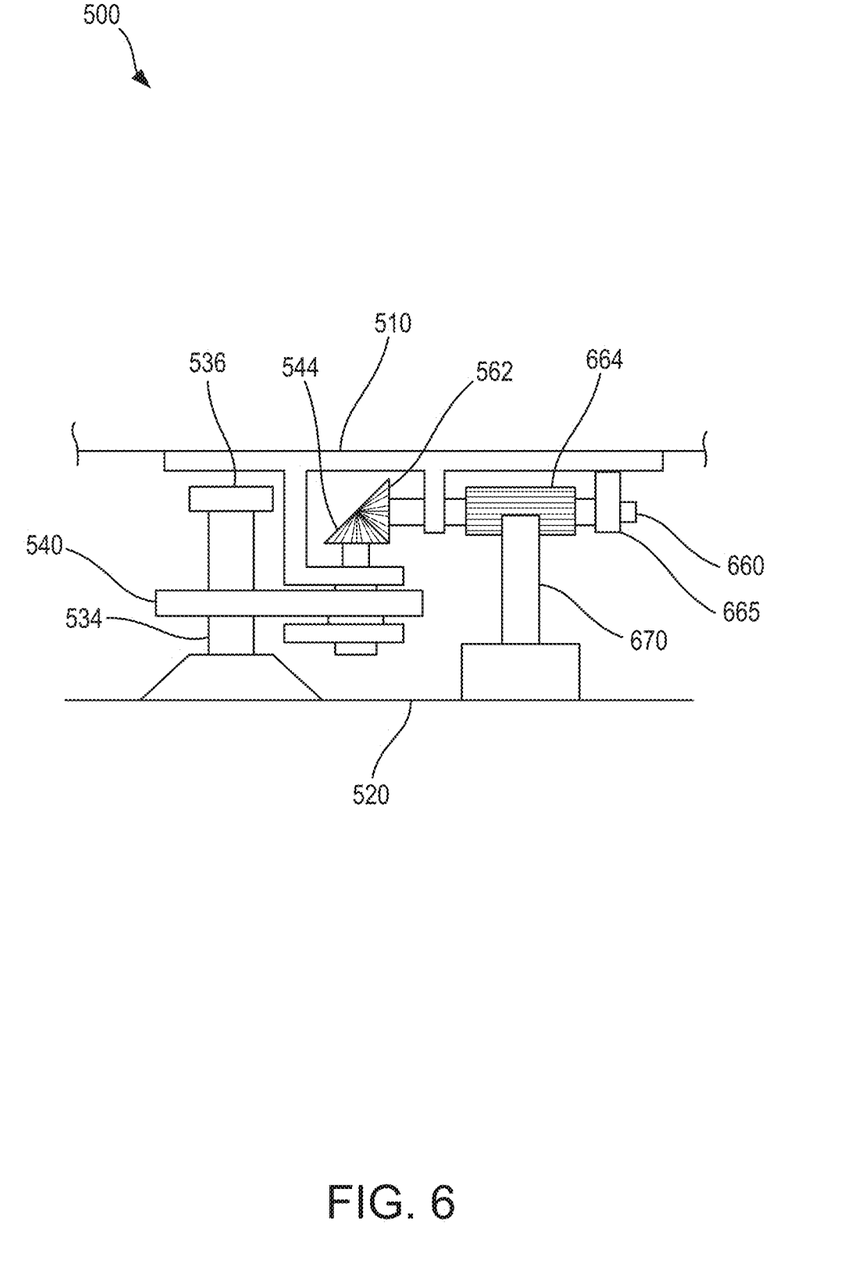
FIG. 6 illustrates a top view of an automatic latching system in accordance with various embodiments of the disclosure.

Referring to FIG. 6, a top view of the automatic latching system 500 is illustrated according to various embodiments. The automatic latching system may comprise a rack 670 and a pinion 660. The rack 670 may be coupled to the IFS 520. The pinion 660 may be mounted to the pylon 510 via a pinion bracket 665. The rack 670 may comprise gears which engage the pinion gear 664. In response to the IFS 520 being opened, the rack 670 may cause the pinion gear 664 to rotate in a first direction. In response to the IFS 520 being closed, the rack 670 may cause the pinion gear 664 to rotate in a second direction, opposite the first direction. The pinion 660 may further comprise the drive gear 562. The drive gear 562 may rotate with the pinion gear 664. The drive gear 562 may engage the gear 544. Thus, in response to the IFS 520 being closed, the rack 670 may cause the pinion gear 664 to rotate, which causes the drive gear 562 to rotate, which causes the gear 544 to rotate, which causes the latch 540 to rotate and capture the post 534. In response to the IFS 520 being opened, the rack 670 may cause the pinion gear 664 to rotate, which causes the drive gear 562 to rotate, which causes the gear 544 to rotate, which causes the latch 540 to rotate and disengage from the post 534. In the event of a deflection of the IFS 520, the endcap 536 may contact the latch 540 without the rack 670 and pinion 660 causing the latch 540 to disengage from the post 534.

Figure 7:
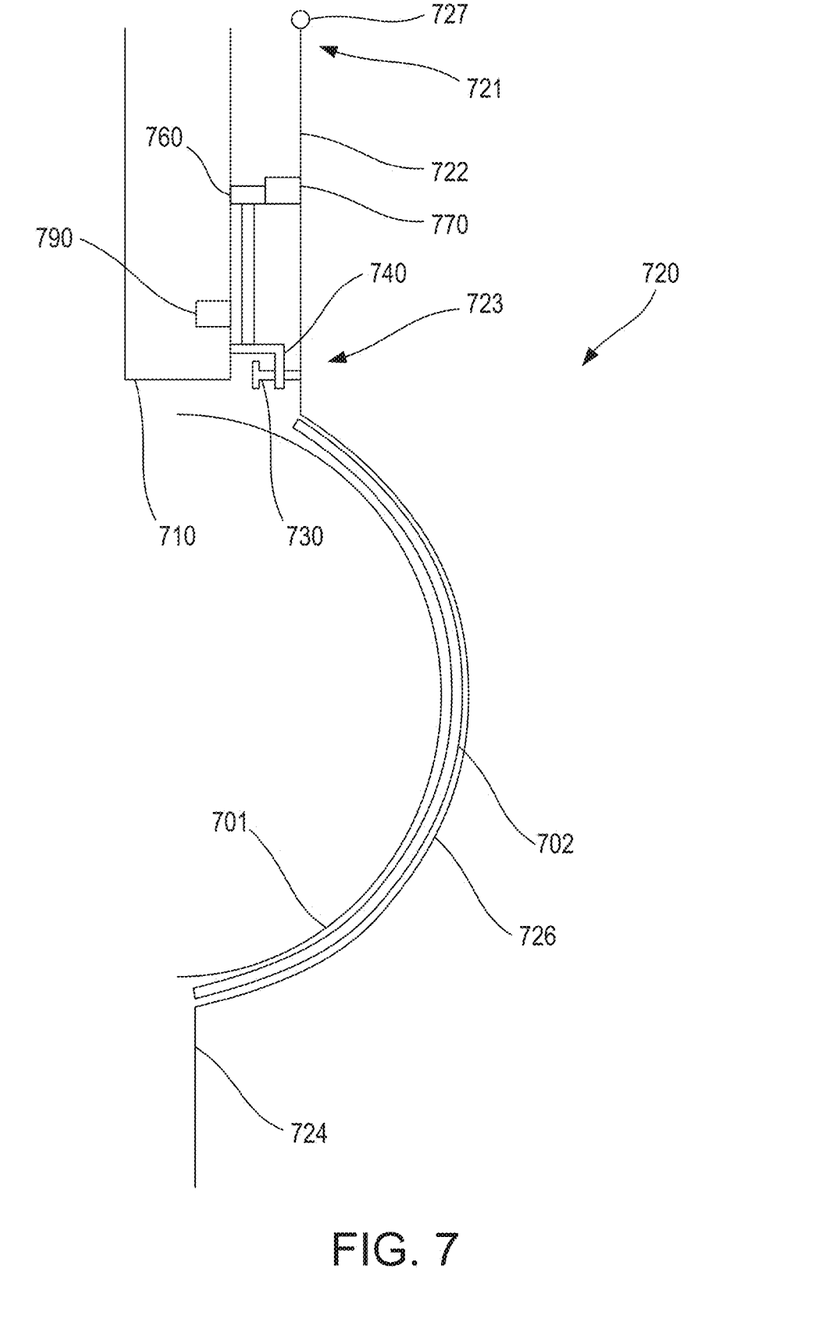
FIG. 7 illustrates a schematic cross-section aft view of a thrust reverser with an automatic latching system in a locked position in accordance with various embodiments of the disclosure.

Referring to FIG. 7, a schematic cross-section aft view of a thrust reverser with an automatic latch in a locked position is illustrated according to various embodiments. The IFS 720 may comprise a top bifurcation panel 722 and a bottom bifurcation panel 724. The top bifurcation panel 722 and the bottom bifurcation panel 724 may be generally vertical panels adjoining a curved panel 726 which forms the core compartment around an engine 701. The IFS 720 may hinge open at a hinge 727 at a top end 721 of the top bifurcation panel 722. The IFS 720 may comprise a bumper 730 coupled to a bottom end 723 of the top bifurcation panel 722. The bumper 730 may transmit loads from the IFS 720 to the pylon 710, or to the opposite IFS panel.

The curved panel 726 may contact a seal 702 at a leading edge of the IFS 720. The seal 702 may contact the engine 701. The seal 702 may prevent bypass air from entering the core compartment. The seal 702 may be at least partially compressed when the thrust reverser halves are closed.

A first mechanical linkage 770 may be coupled to the top bifurcation panel 722 between the top bifurcation panel 722 and the pylon 710. The first mechanical linkage 770 may contact a second mechanical linkage 760. In various embodiments, the first mechanical linkage 770 may comprise a rack, and the second mechanical linkage 760 may comprise a pinion, as described with reference to FIG. 5 and FIG. 6. In response to the top bifurcation panel 722 moving relative to the pylon 710, the first mechanical linkage 770 may cause the second mechanical linkage 760 to rotate. A latch 740 may be operatively coupled to the second mechanical linkage 760. In response to the first mechanical linkage 770 rotating the second mechanical linkage 760, the second mechanical linkage 760 may cause the latch 740 to rotate and unlock.

As the latch 740 is not visible when the thrust reverser halves are closed, a sensing device like a proximity sensor 790 may be positioned to indicate that the latch 740 has been rotated or traversed into its locked or closed position. In various embodiments, the proximity sensor 790 may comprise a laser, transducer, or other contactless position sensor which measures the position of the latch 740.

Figure 8:
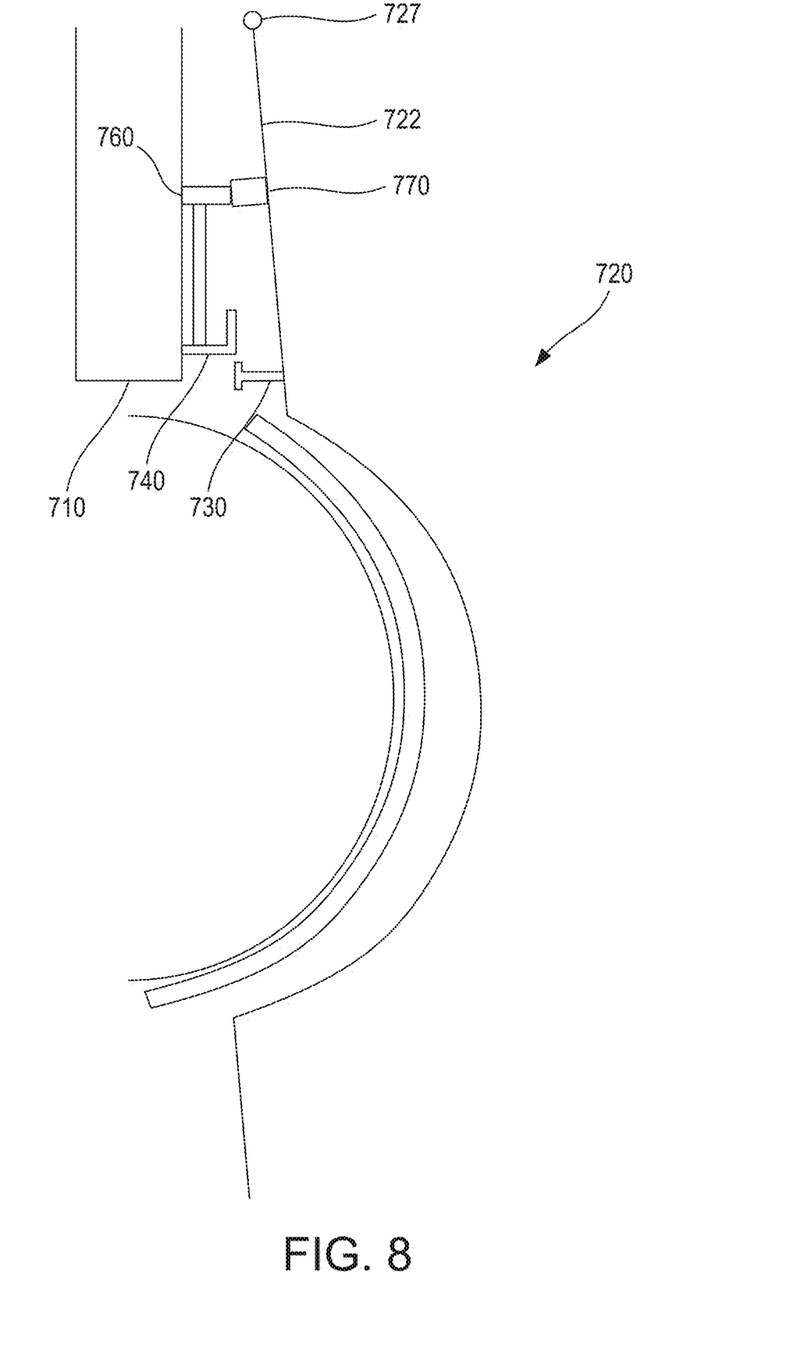
FIG. 8 illustrates a schematic cross-section view of the thrust reverser in a partially open position in accordance with various embodiments.

Referring to FIG. 8, a schematic cross-section view of the thrust reverser is illustrated in a partially open position according to various embodiments. In order to access the engine for inspection or maintenance, the IFS 720 may be hinged open at the hinge 727. As the IFS 720 is opened, the top bifurcation panel 722 may separate from the pylon 710, and the first mechanical linkage 770 may move relative to the second mechanical linkage 760. The relative movement between the first mechanical linkage 770 and the second mechanical linkage 760 may cause the first mechanical linkage 770 to rotate the second mechanical linkage 760. The rotation of the second mechanical linkage 760 causes the latch 740 to release, which allows the IFS 720 to continue to rotate without the latch 740 catching the bumper 730.

Figure 9:
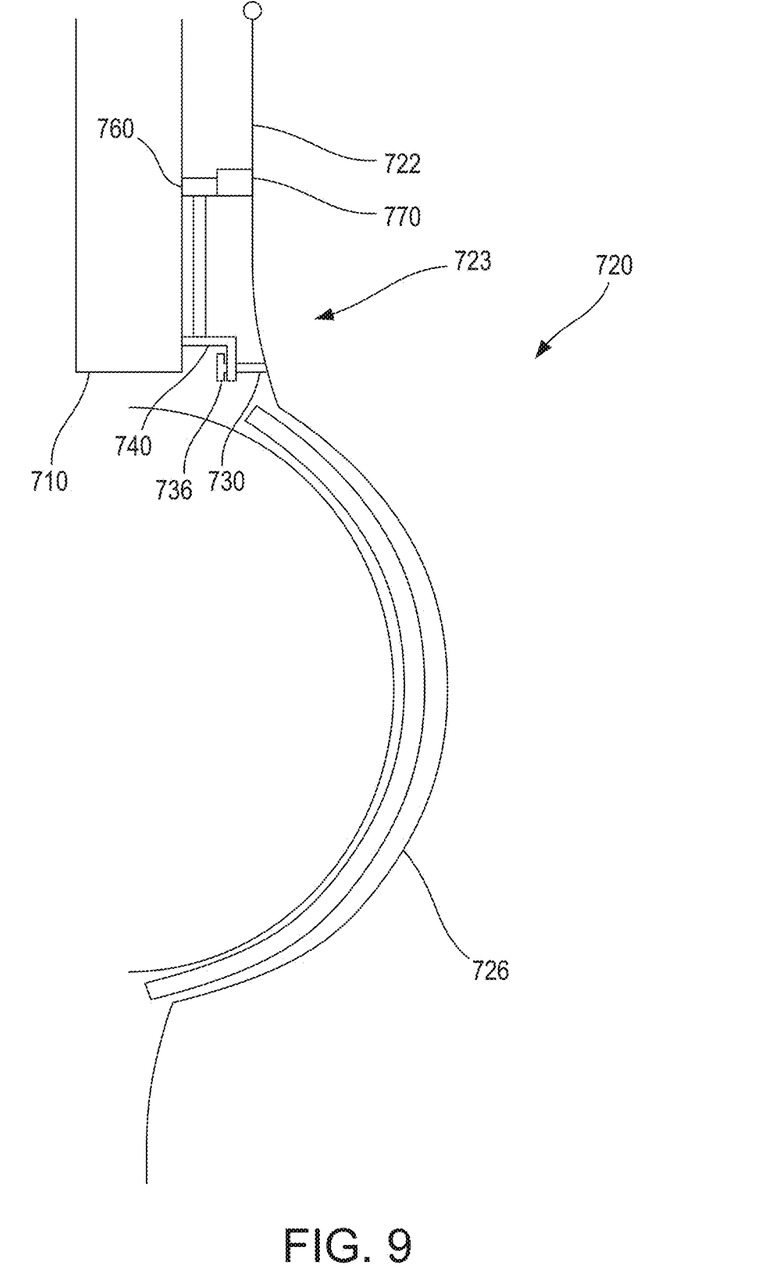
FIG. 9 illustrates a schematic cross-section view of the thrust reverser in a burst duct condition in accordance with various embodiments of the disclosure.

Referring to FIG. 9, a schematic cross-section view of the thrust reverser in a burst duct condition is illustrated according to various embodiments. In the event of a burst duct, the air pressure in the core compartment may rapidly increase. The increase in pressure may cause the curved panel 726 of the IFS 720 to deflect outward. The curved panel 726 may pull the bottom end 723 of the top bifurcation panel 722 outward. The top bifurcation panel 722 may bend, such that the bottom end 723 of the top bifurcation panel 722 deflects more than the top bifurcation panel 722 in the area of the first mechanical linkage 770 and second mechanical linkage 760. As the bottom end 723 of the top bifurcation panel 722 deflects, the endcap 736 of the bumper 730 may contact the latch 740. The latch 740 may prevent further movement of the bumper 730 and further deflection of the IFS 720. The top bifurcation panel 722 may deflect a minimal amount at the first mechanical linkage 770 and second mechanical linkage 760. The minimal amount of movement does not cause the latch 740 to rotate out of its locked position. The latch 740 may prevent further deflection in the IFS 720.

As the IFS 720 deflects outward, the seal 702 may at least partially decompress. However, the seal 702 may maintain contact with, and a seal between, the curved panel 726 and the engine 701. Thus, the seal 702 prevents bypass air from entering the core compartment, which could create a large increase in pressure in the core compartment and further deflect the IFS 720 or cause the thrust reverser to separate from the engine 701 entirely.

Although this latching mechanism is illustrated as extending between one IFS half (left or right) and the pylon using existing bumper structure, it could also be readily adapted as a latching mechanism which extends between one of the IFS halves and the engine, or between the two (left and right) IFS halves. Furthermore, although described primarily as a rack and pinion, the mechanical linkages described herein may be any mechanical components which may interact to open or close a latch in response to the thrust reverser halves opening or closing.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. An aircraft nacelle comprising:
    a first thrust reverser half and a second thrust reverser half coupled to a pylon, wherein the first thrust reverser half and the second thrust reverser half are rotatable about hinges between a closed position in which the first thrust reverser half and the second thrust reverser half enclose a core compartment, and an open position in which the first thrust reverser half and the second thrust reverser half are separated and allow access to the core compartment; and
    a locking mechanism configured to maintain a seal in response to a burst duct, wherein the locking mechanism comprises a rack and a pinion, the rack coupled to the first thrust reverser half, and the pinion coupled to the pylon, wherein the locking mechanism is configured to automatically engage and disengage a latch in response to the first thrust reverser half being closed and opened, respectively.

2. The aircraft nacelle of claim 1, wherein the rack is configured to rotate the pinion in a first direction in response to the first thrust reverser half closing.

3. The aircraft nacelle of claim 2, wherein the rack is configured to rotate the pinion in a second direction in response to the first thrust reverser half opening.

4. The aircraft nacelle of claim 1, wherein the locking mechanism comprises a bumper coupled to the first thrust reverser half, wherein the bumper comprises an endcap, and wherein the latch is configured to contact the endcap in response to an increase in pressure in the core compartment.

5. The aircraft nacelle of claim 4, wherein the first thrust reverser half comprises a top bifurcation panel, and wherein the bumper is coupled to the top bifurcation panel, and wherein the rack is coupled to the top bifurcation panel between the bumper and the hinges.

6. The aircraft nacelle of claim 1, wherein the latch is coupled to the pylon.

7. The aircraft nacelle of claim 1, wherein the locking mechanism is configured to cause the latch to disengage in response to a top bifurcation panel separating from the pylon.

8. The aircraft nacelle of claim 1, wherein the latch is coupled to a post having an angled gear.

9. An aircraft nacelle comprising:
    a first thrust reverser half configured to move relative to a pylon in order to open the first thrust reverser half;
    a latch coupled to the pylon and movable between a latched position in which the latch prevents relative movement between the first thrust reverser half and the pylon, and an unlatched position in which the latch permits relative movement between the first thrust reverse half and the pylon; and
    a rack and pinion mechanism, wherein the rack is coupled to the first thrust reverser half, and the pinion is coupled to the pylon;
    wherein the rack and pinion mechanism is configured to rotate the latch between the latched and unlatched positions.

10. The aircraft nacelle of claim 9, wherein the latch unlatches automatically in response to the first thrust reverser half opening.

11. The aircraft nacelle of claim 9, wherein the latch limits deflection of the first thrust reverser half in response to a burst duct.

12. The aircraft nacelle of claim 9, wherein the pinion comprises a first angled gear, wherein the latch comprises a second angled gear, and wherein the pinion is configured to engage the latch via the first angled gear and the second angled gear.

* * * * *